April 23, 1957  D. E. MADDEN  2,789,572
MANUAL RESETTABLE TEMPERATURE-PRESSURE RELIEF VALVE
Filed June 2, 1955
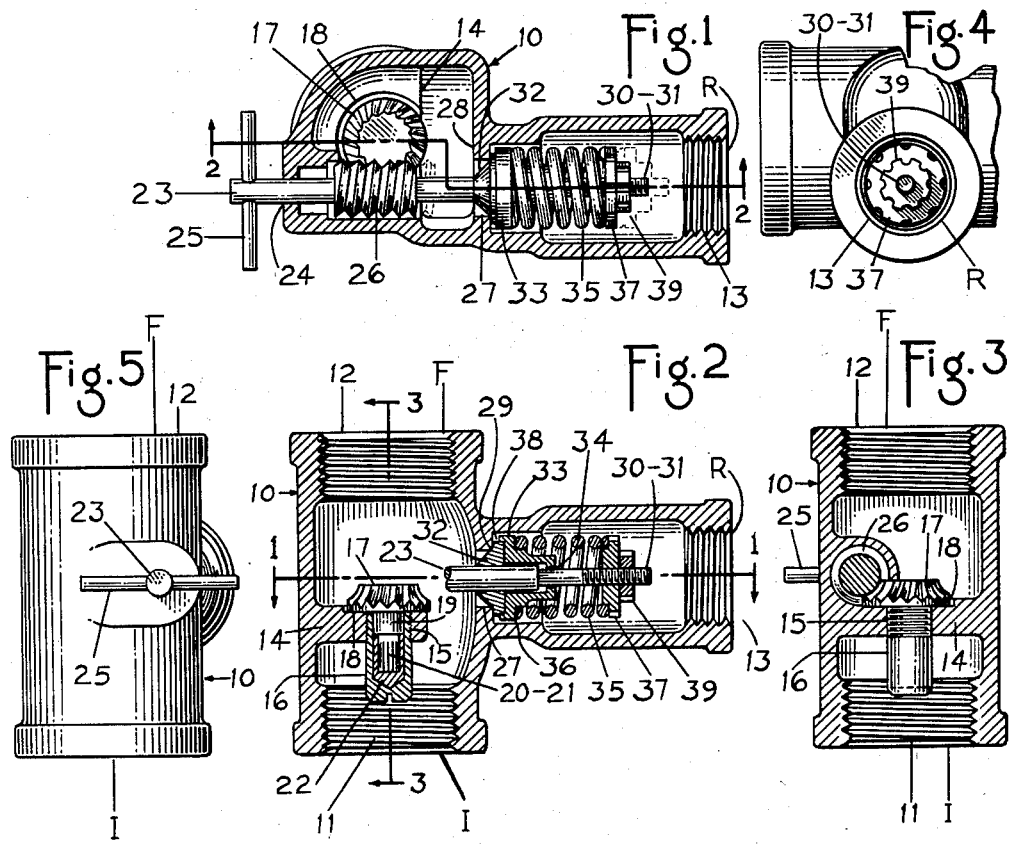
DEAN E. MADDEN
INVENTOR.
BY G. Lorenz Miller
ATTORNEY United States Patent Office 2,789,572
Patented Apr. 23, 1957

2,789,572

MANUAL RESETTABLE TEMPERATURE-PRESSURE RELIEF VALVE

Dean E. Madden, Decatur, Ill., assignor to A. W. Cash Valve Manufacturing Corporation, Decatur, Ill.

Application June 2, 1955, Serial No. 512,660

6 Claims. (Cl. 137—73)

This invention relates to a manual resettable temperature-pressure relief valve.

The invention is more particularly concerned with a valve structure adapted for use in domestic water heaters.

At the present time, the most popular way of protecting domestic water heaters from dangerously excessive temperatures in the event of faulty operation of the automatic thermostat, is the provision of a temperature and pressure relief valve.

At present, a majority of the devices available for temperature protection is a fusible plug. Such plug, which is made of various alloys, is designed to melt at predetermined temperatures somewhere between 175° F. and 212° F. When the temperature in the water tank reaches the melting point of the plug, same melts and is blown clear of the valve by the internal pressure in the system.

Under the above circumstances, it is necessary to dismantle the valve and provide same with a new plug since the replaced plug was expendible, and accordingly cannot be used again.

These circumstances present a problem from a servicing standpoint. There are many relief valve manufacturers in the United States and most of them supply three or four different models of fusible plugs.

A plumber or gas utility serviceman might therefore have to carry as many as 50 or 75 different types of fusible plugs in his kit in order to enable him to take care of the various types of relief valves he finds installed.

Such conditions are not only confusing to the serviceman but are dangerous as well, because of the difficulty in determining exactly what type of metal or exactly what particular plug should be used for each tank being serviced. If an error is made in the judgment or calculation of the serviceman, the calibration is thrown off considerably, and dangerous excess temperatures could result.

It is accordingly a primary object of this invention to provide a relief valve structure which fullly overcomes the above noted objections to existing relief valves.

A further object of the invention is to provide a temperature-pressure relief valve having a non-expendible fusible plug which is inherently rendered operative and inoperative by predetermined temperatures of the water in a tank.

Other objects and advantages of the invention will become apparent in the course of the following detailed description, taken in connection with the accompanying drawing, wherein:

Fig. 1 is a sectional view as observed in the plane of line 1—1 on Fig. 2.

Fig. 2 is a sectional view as observed in the plane of line 2—2 on Fig. 1.

Fig. 3 is a sectional view as observed in the plane of line 3—3 on Fig. 2.

Fig. 4 is a fragmental elevational view as observed from the right of Fig. 1.

Fig. 5 is an elevational view as observed from the left of Fig. 2.

Fig. 6 is an enlarged sectional detail view of the cup member shown in Figs. 2 and 3.

Fig. 7 is a top plan view of the cup shown in Fig. 6.

Referring now in detail to the drawing, 10 designates a T-form valve housing having an internally threaded end 11 providing the inlet I from the water heating tank. The housing further includes an internally threaded end 12 providing an outlet F to fixtures and a third internally threaded end 12 providing an outlet F to fixtures and a third internally threaded end 13 providing a relief outlet R.

The housing 10 is provided with a web 14 which is disposed transversely of the axis of the threaded ends 11 and 12 and which is provided with a tapped aperture 15 whose axis is in said first axis and in which is removably disposed the externally threaded open end of a cup 16, having the internally disposed serrations 16'.

A pinion gear element 17 is freely supported in a recess 18 in the upper face of the web 14 and is provided with a cylindrical shank rotatably disposed within the cup 16 and which shank includes a relatively short portion 19 adjacent the gear element 17 which has a snug rotatable engagement with the inner wall of the cup 16 and a portion 20 below the portion 19 which is concentric therewith but of less diameter. The shank portion 20 is provided with longitudinal serrations 21 and the cup 16 is provided with a body of normally solidified fusible material 22 beneath the shank portion 19 and in contacting relation with the serrated shank portion 20 and the serrations 16' in the cup 16.

A shaft 23 is disposed within the housing 10 axially of the portion having the threaded end 13 and which is rotatably and axially journalled in the housing, as indicated at 24, and the shaft has one end portion thereof extended externally of the housing and provided with an adjusting handle 25. The shaft 23 is provided with a worm 26 in operative engagement with the gear element 17 and the shaft extends into that portion of the housing having the relief threaded end 13.

The housing 10 is provided with an aperture 27 in a wall 28 through which the shaft 23 extends and which provides a valve seat 29.

The end of shaft 23 opposite the handle 25 extends through said aperture 27 and a slight distance within the relief outlet portion of the housing and such end of the shaft is provided with a reduced extension 30 having a threaded end 31.

An annular valve member 32 preferably of "Teflon" is slidably supported on shaft 23 and normally sealingly engages the valve seat 29.

A sleeve member 33 of cup-form has the skirt portion thereof slidably supported on shaft 23 adjacent the reduced extension 30 and whose free end engages the valve member 32. The said reduced shaft extension 30 extends through an aperture 34 in the base of the sleeve member 33.

A relatively heavy coil spring 35 surrounds said shaft extension 30 and the skirt of the sleeve member 33 with its opposite ends reacting on a flange 36 on the sleeve member and an adjusting nut 37 on the reduced extension 30 and the said sleeve flange 36 is provided with a recess 38 in which said valve member 32 is seated.

A locknut 39 is provided on extension 30 and being frictionally engageable with nut 37 for maintaining same in adjusted position.

From the above detailed description of the improved relief valve structure, it will be apparent that when the material 22 is in a cooled hardened state, as will be the case when the water within a tank is at a normal temperature, the gear element 17 will be restrained against rotation due to the interlocking of the metal body with the serrations 21 in the gear shank and the serrations 16' in the cup 16.

With the gear element in such locked condition the shaft 23 will be restrained against axial movement.

Under this condition, however, the spring 35 upon proper adjustment of nut 37 will urge the valve member 32 into firm seating engagement with the valve seat 29 and the spring will normally be under substantial compression and which would be active to move the shaft 23 to the right (Fig. 2) upon unlocking of the gear element 17.

When the gear element is locked, the structure functions as a normal relief valve and the pressure at which it is operative is dependent upon the degree of compression of the spring 35.

When subjected to dangerously high temperatures, the material 22 will melt to a liquid state and will accordingly free the gear element 17 for rotation about its axis, which in turn permits shaft 23 to move axially toward the relief outlet R, as indicated by dotted lines in Fig. 1, thereby relieving the compression tension of the spring 35 whereby the pressure of the valve member 32 on the seat 29 is released. Water under pressure would then normally be discharged and if it be replaced by cooler water the temperature in the system will be reduced to a point sufficient to result in solidifying of the metal 22. When this occurs, the shaft 23 can be turned by the handle 25 (gear member 17 acting as a nut) to a desired point of adjustment.

The material 22 being solidified again, such point of adjustment will, of course, be re-established and maintained until a dangerous temperature may again cause pressure relief as hereinbefore described.

It will be obvious that as a safety measure the valve cannot be reset until a safe temperature is restored in the system.

While I have disclosed my invention in accordance with a single preferred structural embodiment thereof, such is to be considered as illustrative only, and not restrictive, the scope of the invention being defined in the sub-joined claims.

What I claim and desire to secure by U. S. Letters Patent is:

1. A temperature-pressure relief valve structure for use in maximum temperature limitation of water in water heating tanks, comprising a T-form housing having inlet and outlet ends in the head portion thereof for connection with a tank and fixtures to be supplied with hot water and having a relief end in the stem portion thereof, there being a wall between the head and stem portions having an aperture therein providing a valve seat within said stem portion, a shaft extending transversely through said head portion and supported thereby for both rotative and axial movement, said shaft extending into said stem portion, a valve member slidably supported on said shaft within said stem portion for co-operation with said seat, adjustable spring means supported by said shaft normally maintaining said valve member in engagement with said seat, and means in said head portion operative to lock said shaft against axial movement and being rendered operative and inoperative by the temperature of water in a tank with which the valve structure is operatively associated.

2. The structure according to claim 1, wherein said shaft is provided with a threaded reduced end in said stem portion, and said spring means comprising a sleeve slidably supported on the shaft and engaging said valve member, an adjusting nut threaded on said reduced shaft end and a coil spring having its opposite ends engaged with said sleeve and said adjusting nut.

3. The structure according to claim 2, wherein said valve member is formed of "Teflon."

4. The structure according to claim 1, wherein said head portion is provided with a web disposed transversely to the axis thereof, and said means comprising a worm on said shaft, a gear element rotatably supported in said web in the axis of said head portion and in constant mesh with said worm, said gear element being provided with a shank having a roughened locking surface and temperature responsive means in contact with said shank for normally locking same against rotation and for permitting rotation thereof upon occurrence of high water temperatures.

5. The structure according to claim 4, wherein said shank is rotatably supported in a cup having a serrated internal wall surface, said cup secured in said web and depending therefrom, and said temperature responsive means comprising a body of normally solid fusible material disposed within said cup in surrounding relation to said roughened shank and in circumferential relation to said serrated internal wall surface in said cup, said normally solid material normally retaining said shank and gear element against rotation and being fusible under predetermined high water temperature to allow said shank and gear element to rotate with a resulting axial movement of said shaft.

6. The structure according to claim 5, wherein said shaft extends externally of said head portion and is provided with means to facilitate rotation of the shaft when said gear element is in locked position for adjustment of the valve member.

References Cited in the file of this patent

UNITED STATES PATENTS 1,981,012    Wegener _____ Nov. 20, 1934